Sept. 15, 1942.          W. H. ARMSTRONG                 2,295,623
                          NONMETALLIC PIPING
                         Filed July 10, 1941           2 Sheets-Sheet 1
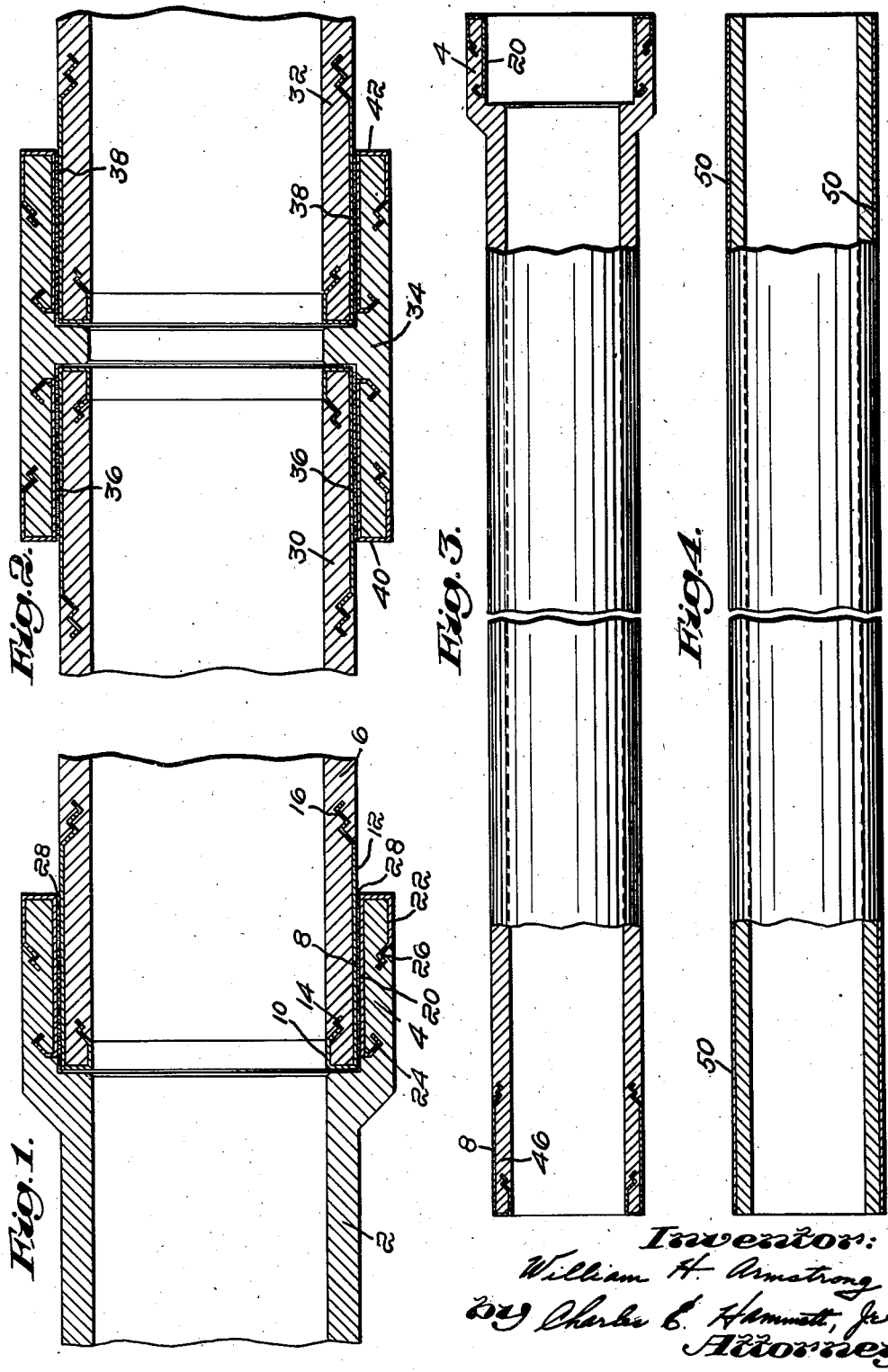

Sept. 15, 1942. W. H. ARMSTRONG 2,295,623
NONMETALLIC PIPING
Filed July 10, 1941 2 Sheets-Sheet 2
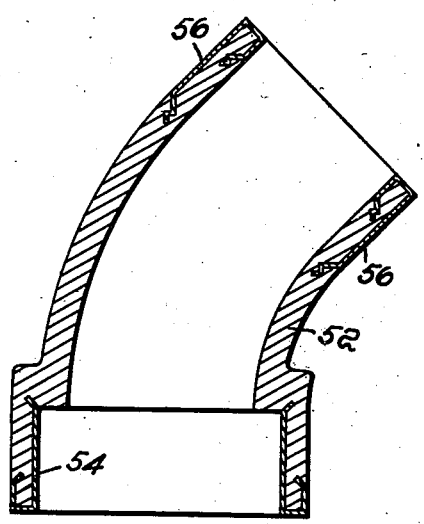
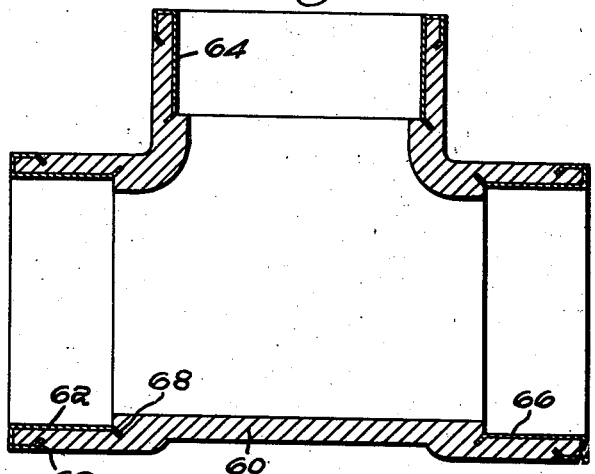
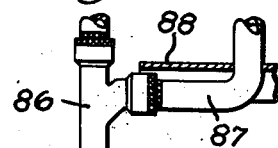
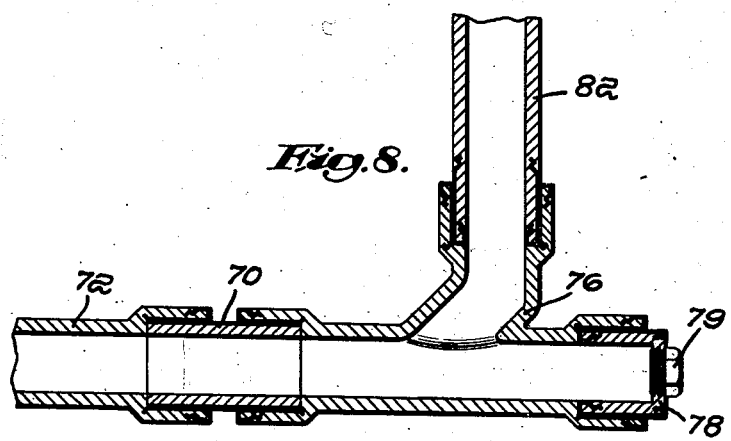
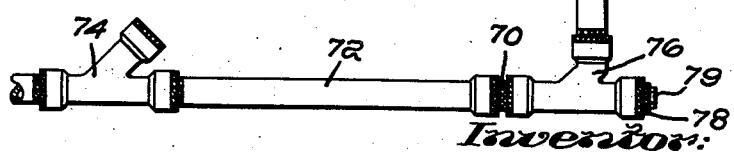

Patented Sept. 15, 1942

2,295,623

UNITED STATES PATENT OFFICE 2,295,623

NONMETALLIC PIPING

William H. Armstrong, Plymouth, Mass.

Application July 10, 1941, Serial No. 401,749

3 Claims. (Cl. 285—115)

This invention relates to piping and more particularly to pipe sections and pipe fittings made chiefly of non-metallic materials.

An object of the invention is to provide essentially non-metallic piping capable of being joined quickly, cheaply and in an effective manner by workmen trained in present-day practice. Another object of the invention is to combine the economy inherent in the use of non-metallic pipes and fittings with the effectiveness and facility of joining possessed by certain types of metallic piping. A further object of the invention is the provision of standard and make-up sections of essentially non-metallic pipe so that a pipe of any length may be made of substantially non-metallic material having all its joints as firm and as tight as joints between the best metallic pipe sections.

Although pipe sections have already been made of a number of non-metallic materials having the advantage of cheapness and availability, the methods of joining such pipe heretofore employed do not meet the requirements of effectiveness and neatness associated with usual plumbing practice in buildings and dwellings. It is necessary for many uses (especially drains) that the joint should be gas-tight as well as liquid-tight, and it is desirable that a joint should be capable of being made tight and of remaining tight irrespective of its position, whether horizontal, vertical or oblique or whether the outer element (or bell) of the joint is positioned above or below the other element.

The present invention is designed to furnish non-metallic piping with joints of such quality as to permit the use thereof in dwellings and other buildings and also to furnish a type of piping that is both economical and effective.

In the manufacture of pipe sections and fittings according to the present invention, facings of a metal on which molten solder will flow and adhere, such as copper base metals, are provided at the orifices to be joined in such a manner that the facings of two pipe ends to be joined will telescope upon each other leaving only a very small clearance between them. The facings also extend to outer parts of the pipe or fitting in order to facilitate the application of heat to the joint.

In the joining of pipe according to my invention, the pipe section or fittings to be joined, after suitable cleaning and fluxing, are telescoped together as above described, after which the joints are heated, and then solder is applied to the heated joints and caused to flow therebetween by capillary attraction as in the case of "sweat joints" as now made with pipes and fittings of copper and brass.

Further description of the invention will be made with reference to the attached drawings, in which:

Fig. 1 shows in longitudinal section a completed joint between two sections of non-metallic pipe according to the present invention;

Fig. 2 shows, also in longitudinal section, another type of joint according to the presen invention;

Fig. 3 shows in side elevation and partly in section a standard length section of pipe made in accordance with this invention;

Fig. 4 shows, also in side elevation and partly in section, a section of pipe adapted to be used with one or more sections of the type shown in Fig. 2 in order that the pipe strings of various lengths may be formed;

Figs. 5 and 6 show, in section, typical fittings made according to the present invention;

Fig. 7 is an elevation of part of a plumbing installation illustrating the use of various fittings and pipes; and Fig. 8 is a detail, in section, of part of the installation of Fig. 7.

The joint illustrated in Fig. 1 is of the bell-and-spigot type. The pipe 2 is provided with a widened end or bell 4, which forms the female member of the joint. The extremity of the pipe 6, which forms the male member of the joint, is provided with a metallic facing 8 made of copper-base metal, for example pure copper, which at one end extends around the end of the pipe 6, as shown at 10, in order to attach the facing more securely to the pipe and at the other end extends back of the joint, as shown at 12. The facing may with advantage be anchored in the body of the pipe by means of flanges such as are shown at 14 and 16.

The inner surface of the bell 4 is likewise provided with a facing 20 of copper-base metal, for example pure copper. This facing extends around the end of the bell and over a portion of the outside of the bell, as shown at 22. It may advantageously be anchored in the body of the pipe 2 by flanges such as are shown at 24 and 26.

The anchor members 14, 16, 24 and 26 hold the facing against movement relative to the non-metallic body of the pipe. They also serve to lengthen and contort any possible leakage or seepage path between the facing and the non-metallic body. These anchor members are preferably continuous flanges and may have one or more bends or angles as variously shown at 16 and 24 in Fig. 1 and at 68 in Fig. 6. If in a particular installation the seepage problem should be less important, the anchor members may be formed as fins or tabs rather than as continuous flanges.

The pipes 2 and 6, the bell 4 and the facings 8 and 20 are so designed and dimensioned that the clearance between the facings is very small, as is more particularly pointed out below. When the joint is completed, as shown in Fig. 1, the narrow cylindrical space between the facings is filled by a thin film of solder 28 which securely fastens the facings 8 and 20, and therefore the pipes 2 and 6, together.

In order to form the above-described joint, the outer surface of the facing 8 and the inwardly exposed surface of the facing 20 are first cleaned with a suitable abrasive, such as steel wool, and then coated with a suitable flux, such as the common petroleum paste containing as active ingredients rosin or zinc chloride. The ends of the pipes 2 and 6 are then telescoped together by inserting the end of the pipe 6 into the bell 4. Heat is then applied to the surfaces 12 and 22 extending outwardly from the joint and provided for that purpose. The fluxed surfaces are thereby heated by conduction far more quickly and with less risk of overheating the non-metallic body of the pipe than if heat were applied to and through the non-metallic body. Solder is then applied about the circumference of the mouth of the narrow space between the fluxed metal facings. The metal facing should be hot enough to melt the solder. As it melts, the solder is drawn into the space between the fluxed cylindrical surfaces by reason of capillary attraction. The joint is then allowed to cool. As it hardens, the soldier fastens the facings, and hence the pipes, solidly together.

In order that the joint may be liquid- and gas-tight, it is necessary that the solder should fill the entire circumference of the joint. To assure this it is therefore important that the space between the telescoped metal surfaces be narrow and quite uniform in cross-section, so that surface forces may draw in the solder between the telescoped surfaces by the process known as capillary attraction. The metal facings must therefore be manufactured and shaped to close tolerances. I prefer clearances between .002 and .004 inch, such as are commonly used in "sweat joints" of copper pipes and fittings.

Fig. 2 shows another form of joint. Here two spigot ends of pipe sections 30, 32 are joined by a pipe fitting 34 of the "double hub" type. Outwardly exposed facings of copper-base metal 36, 38 are provided on the ends of the pipes 30, 32 respectively, as at 8 in Fig. 1, and inwardly exposed facings 40, 42, corresponding to the facing 20 of Fig. 1, are provided on the fitting 34.

The above-described type of joint can conveniently be made with the common 50-50 tin-lead solder. For strong joints designed to serve under temperatures above the usual room temperatures, 95-5 tin-antimony solder may advantageously be used.

The joints are entirely solid and tight, and even the tin-lead solder joints exhibit comparatively small creep because of the thinness of the solder film.

A pipe section according to my invention is illustrated in Fig. 3. The pipe has a bell 4 at one end, provided with a facing of copper-base metal 20, in the manner illustrated in Fig. 1. At its other extremity it has a plain end provided with a facing 8, also in accordance with Fig. 1. Some sections could be made with two spigot ends, each resembling the spigot end 46 in Fig. 3.

For convenience of manufacture, pipes of the types just described would ordinarily be made in a few standard lengths only, say 5 feet and 2½ feet. Because of the difficulty of suitably fastening a metal facing on the cut end of a standard section, I have devised a different method for making up odd lengths of pipe. For this purpose I provide lengths of pipe made with an outer facing 50 of copper-base metal extending over the entire length of the pipe section, as shown in Fig. 4. The outside diameter of the sheath or sleeve 50 is dimensioned suitably for telescoping into the facing 20 of the bell 4 of a standard section such as shown in Fig. 3, or into the inwardly exposed facing of a pipe fitting such as is shown at 40 in Fig. 2, at 54 in Fig. 5, and at 62, 64 and 66 in Fig. 6, in each case leaving between the telescoped facings a clearance small enough to possess the above-described capillary action in connection with molten solder.

A pipe section such as is shown in Fig. 4 may be cut to any desired length, so that, together with standard sections, pipe strings of various lengths may be put together (see for instance Fig. 7) without using more of the continuously sheathed pipe in any single instance than the shortest length in which a standard section (Fig. 3) is made. The type of pipe shown in Fig. 4 will, of course, be more expensive than that shown in Fig. 3 because of the larger amount of metal used, so that it is desirable to use the standard sections shown in Fig. 3 as much as possible.

It is, of course, entirely practical to use ordinary copper or brass pipe, together with the standard sections illustrated in Fig. 3, in place of sections of the type shown in Fig. 4, provided that the outside diameter is suitable; but a pipe constructed according to Fig. 4 should prove to be more economical, at least during a period of scarcity or high prices of copper and zinc.

Figs. 5 and 6 show typical pipe fittings according to my invention. The fitting shown in Fig. 5 is of the type known as a "street elbow" and that in Fig. 6 is a T. The former has a body 52 of non-metallic material, a facing 54 of copper-base metal adapted to engage telescopically an outwardly exposed copper surface, such as that of the facing 8 in Figs. 1 and 3, and a facing 56 adapted to engage an inwardly exposed copper surface such as the facing 20 on the bell end 4 in Figs. 1 and 3.

The T shown in Fig. 6 likewise has a hollow body 60 of non-metallic material. It has three orifices provided with facings 62, 64, 66 respectively, made of copper-base betal and functioning in the manner of the facing 54 in Fig. 5.

As in the case of the pipe sections shown in Fig. 3, the metal facings of the fittings shown in Fig. 5 and Fig. 6 extend to outer parts of the body not covered by the joint so that heat may be applied directly to the metal and quickly conducted to the joint. The facings, again, are shown anchored in the body of the fitting by flanges such as 68 and 69 in Fig. 6, which not only hold the facing against movement relative to the body of the fitting, but also reduce seepage and leakage around the back of the facing by making the possible leakage path longer and more tortuous.

Fittings of the type of construction illustrated in Figs. 5 and 6 may be of substantial commercial importance even for use with copper or brass pipe, because the cost factor is particularly important in the matter of metallic fittings.

Fig. 7 shows part of a typical plumbing installation suitable for a drain in a building. At 70 is shown a piece of pipe of the type shown in Fig. 4 used together with the standard length section 72 to complete the odd length of pipe joining the Y fitting 74 and the T—Y fitting 76. One horizontal orifice of the latter fitting is provided with a drain plug 78, shown in more detail in Fig. 8.

The piece of pipe 80 also is made according to Fig. 4 and then cut to size to fit, together with standard sections 82 and 84, between the T—Y fitting 76 and the T—Y fitting 86. Part of a building floor structure is shown at 88.

In Fig. 8 is shown, in more detail, the drain plug 78, the T—Y fitting 76, the pipe section 70, and one end of the pipe sections 72 and 82. This is a sectional view, showing the facings of copper-base metal as in Figs. 1–6. The drain plug 78 is joined to the T—Y fitting 76, as in the case of other joints shown herein, by a film of solder between telescoped metal facings, and is provided with a threaded plug 79 provided with a bolt head. The non-metallic body of the fitting 78 must, of course, be of a type in which threads of sufficient strength can be made. Such materials are at present known and available.

Exposed metal surfaces, such as the outside surface of the extensions of the metal facings provided for the efficient application of heat to the joint are shown on Fig. 7 by cross shading, as at 90 and 92, where extensions corresponding to 12 and 22, respectively, of Fig. 1 are shown.

Various non-metallic materials may be used to form the body of pipe sections and pipe fittings (which may conveniently be referred to collectively as piping elements) according to this invention. It is, of course, necessary that at least that part of the body of the piping element which is adjacent to the metal facing should be able to withstand the high temperatures at which the solder becomes fluid, which may be as high as 500° F., depending on the type of solder used. Various materials adapted to molding processes, such as cementitious mixtures, ceramic materials, phenol-aldehyde and other thermosetting molding compounds, may be used, either alone or laminated with other materials, such as fibrous material. The fibrous material used may be organic, such as paper, or inorganic, such as asbestos or mineral wool.

The cheaper compounds are to be desired for pipe sections, but smaller fittings, especially those of more complicated shapes (including valves and the like) may advantageously be made of more expensive and higher quality material, such as synthetic organic thermosetting molding resins.

Pressure molding methods are useful in the preparation of piping elements according to this invention, since the application of pressure insures penetration of the molding compound closely around the anchor fins 14, 16, 24, 26.

The metal facings may be preformed as by well-known stamping and drawing methods. In the case of a preformed facing, the facing is placed in the mold and the mold is then filled with the non-metallic molding compound and treated to set the material.

For the metal facings of my invention, I can use any metal the surface of which is wetted by molten solder and to which such solder will adhere and such metals I term "solder-compatible." Of these metals I prefer copper or brass. Other copper-base metals, however, such as bronze, can also be used with good results. Also lead-base and tin-base metals, as well as zinc, could likewise be used, since they are compatible with common solder metals. But copper-base metals are generally cheaper and more easily handled in this type of construction.

Although my invention is particularly adapted for application to piping systems having non-metallic pipe sections of the above-described type and substantially non-metallic pipe fittings of the same type of construction, the invention is also useful for pipe fittings of the herein-described type to be used with copper, brass, or bronze pipe, or for pipe sections of the herein-described types to be used with conventional copper, brass, or bronze "sweat fittings."

I claim:

1. A joint between a pair of hollow tubular pipes of non-metallic material, comprising a pair of hollow tubular sleeves of solder-compatible metal having different diameters each fixedly mounted upon an end of one of said pipes and forming a facing therefor, said sleeves secured together in mutual telescopic relation with a portion of each sleeve exposed beyond the telescoped portion thereof, said sleeves being so constructed and proportioned as to provide between their opposed telescoped surfaces a capillary passage open at the exterior of the joint, and a thin film of solder in said passage uniting said opposed, telescoped surfaces of said sleeves.

2. A pipe joint comprising a pair of hollow tubular bodies of non-metallic material, one of said bodies having an end of smaller diameter than an end of the other said body and telescopically seated therein, said ends of said bodies having their opposed telescoped surfaces each covered by a facing of a solder-compatible metal, each said facing having an exposed portion extending beyond the telescoped portion thereof, said ends and said facings being so constructed and proportioned as to provide between the opposed telescoped surfaces of said facings a capillary passage open at the exterior of the joint, and a thin film of solder in said passage uniting said opposed telescoped surfaces of said facings.

3. A pipe joint comprising a pair of hollow tubular bodies of non-metallic material, one of said bodies having an end of smaller diameter than an end of the other said body and telescopically seated therein, said ends of said bodies having their opposed telescoped surfaces each covered by a facing of a solder-compatible metal, each said facing having an exposed portion extending beyond the telescoped portion thereof, said ends and said facings being so constructed and proportioned as to provide between the opposed telescoped surfaces of said facings a capillary passage open at the exterior of the joint, and a thin film of solder in said passage uniting said opposed telescoped surfaces of said facings, each of said facings having at least one of its ends reversely bent and embedded in the non-metallic material of the corresponding body member.

WILLIAM H. ARMSTRONG.